United States Patent [19]

Fevre

[11] Patent Number: 5,362,170
[45] Date of Patent: Nov. 8, 1994

[54] MONOBLOC COUPLING
[75] Inventor: Laurent Fevre, Epernon, France
[73] Assignee: NACAM, Vendome, France
[21] Appl. No.: 26,282
[22] Filed: Mar. 4, 1993
[30] Foreign Application Priority Data
  Mar. 5, 1992 [FR] France ............... 90 02670
[51] Int. Cl.$^5$ .............................. F16D 3/00
[52] U.S. Cl. .................... 403/57; 403/157; 403/159; 464/134
[58] Field of Search ............ 403/57, 157, 159, 58, 403/74, 88, 308; 279/84; 72/379.2; 464/134, 135

[56] References Cited
U.S. PATENT DOCUMENTS

| 296,027 | 4/1884 | Mark | 403/308 |
|---|---|---|---|
| 3,804,541 | 4/1974 | Pitner . | |
| 3,867,050 | 2/1975 | Pitner . | |
| 5,018,899 | 5/1991 | Kuribara . | |
| 5,188,474 | 2/1993 | Ohkubo et al. | 403/57 |

FOREIGN PATENT DOCUMENTS

| 2181318 | 11/1973 | France . |
|---|---|---|
| 2448068 | 8/1980 | France . |
| 2649375 | 1/1991 | France . |
| 1450122 | 2/1969 | Germany . |

Primary Examiner—Randolph A. Reese
Assistant Examiner—Anthony Knight
Attorney, Agent, or Firm—Burns, Doane, Swecker & Mathis

[57] ABSTRACT

A monobloc coupling is formed from a sheet and is adapted to be connected, on the one hand, to a torque transmitting device, and on the other hand, to a receiving device. This coupling includes three sections along an axis. A linking section for lining the coupling with the torque transmitting device is provided and includes a hub which is axially split and which is connected to the torque transmitting device by a fastening unit. An intermediate section is provided and is formed with two claws having longitudinal rims. The rims have complementary profiles which fit together and absorb the stresses on the coupling unit. An angle is formed between two claws 6 and 7 so that the rims fit one another. A linking section 3 for linking the coupling with the receiving device is provided and includes linking or fastening legs. The coupling is useful in the steering units of automotive vehicles.

14 Claims, 2 Drawing Sheets

MONOBLOC COUPLING

FIELD OF THE INVENTION

This invention relates to monobloc couplings, connected on the one hand to a torque transmitting device, and on the other, to a receiving device, and it relates more especially to coupling units obtained from a sheet in the form of a blank or a cardan joint-type tube section.

BACKGROUND OF THE INVENTION

Cardan joint type monobloc couplings, obtained from a single sheet element, are well-known, such as the one described in the French patent No. 1 515 051.

The French patent No. 2 458 002 on behalf of the Applicant relates to a cardan joint obtained from a sheet blank. It exhibits an open hub with reinforced holes for letting its fastening means through. This type of coupling does not allow absorbing the relatively important stresses which may take place in certain applications.

The French patent No. 2 448 068 relates to a cardan joint, produced by cutting and cold-rolling of a sheet blank, and includes a jaw formed by two legs attached to a split hub. According to this document, the split hub exhibits two longitudinal rims which must be rigorously opposite one another, so that their profiles may penetrate into one another in order to sustain stresses liable to distort this hub. As the hub is relatively compact and as longitudinal rims must face each other, specific disengagement means call for a delicate manufacture and a random quality level. These performance problems cause an increase in cost and a quality level which is not constant, which is particularly disturbing for mass-production in the automotive industry.

Objects and Summary

The purpose of this invention is to avoid the drawbacks mentioned hereabove and to suggest a monobloc coupling obtained from a sheet, especially in the form of a blank or tube section connected on the one hand to a torque transmitting device and on the other, to a receiving device. This coupling exhibits a split hub whose both longitudinal rims are arranged in order to absorb the stresses liable to distort this coupling, while enabling extremely easy production with constant level of quality, as well as correct resistance to stresses liable to distort this coupling, whether this coupling is relatively compact or relatively long in the axial direction because of the various architectures in which this coupling is performed.

According to an embodiment of the invention, the monobloc coupling is obtained from a sheet, especially in the form of a blank or a tube section, and is connected on the one hand to a torque transmitting device, and on the other, to a receiving device. This coupling consists of three sections in the axial direction: a linking section with the torque transmitting device, an intermediate section, and a linking section with the receiving device. The linking section with the torque transmitting device comprises an axially split hub, subjected to the torque transmitting device using a fastening unit. The intermediate section is axially split in order to exhibit two claws. Each of these claws have a longitudinal rim, and both these longitudinal rims exhibit additional profiles, which work together according to a fitting principle in order to absorb the stresses liable to distort this coupling unit. By fitting, we mean the penetration of one of the rims into the side of the other rim and reciprocally. The angle of both claws with respect to one another is determined so that this penetration may be carried out in order to ensure correct fitting. The linking section with the receiving device comprises at least one linking for fastening leg.

Advantageously, the intermediate section is partially circular in shape, then prolongs itself tangentially on both side with a plane portion in order to form the corresponding claw. Moreover, both claws are approximately perpendicular with respect to one another.

In order to separate the first linking section from the intermediate section, both claws are disengaged from the split hub using an opening, which is arranged in the alignment of the hub slot.

According to a preferred embodiment, each longitudinal rim of both claws comprises at least one protrusion or lug, which penetrates into a recess or mortise of complementary shape, carved into the longitudinal rim of the other claw.

According to the invention, the split hub which makes up the first linking section is fitted with two wings arranged on each side of the longitudinal slot of the hub. Each wing has hole with the same axis, in order to materialize the assembly axis of the fastening unit with the torque transmitting device. According to a variation of the invention, this fastening unit is a tightening bolt. Moreover, the split hub is placed and rotary-engaged with the torque transmitting device using grooves.

In order to obtain a cardan joint claw which applies among others in the directions of automotive vehicles, the linking section with the receiving device comprises two legs arranged symmetrically with respect to the longitudinal axis, i.e., with respect to the rotation axis.

According to another embodiment of the invention, the linking section with the receiving device comprises at least one fastening hook, located on a plane more or less perpendicular to the longitudinal axis, i.e., to the rotation axis.

The structure of the monobloc coupling according to the invention comprises advantageously three sections, whereas the structure of the intermediate section according to the invention enables to sustain stresses liable to distort this hub. Moreover, the presence of this intermediate section allows adapting this type of coupling to all the application architectures, and especially to applications which are relatively long in the axial direction. Finally, the peculiar structure of this intermediate section and the cooperation mode of the two claws with respect to one another, enable to obtain very easy industrial production, hence a very low cost price combined to a constant level of quality.

Description of the Drawings

Other advantages will appear clearly from the invention, which will be better understood using the description given hereunder, with various examples of embodiments, whose list is not exhaustive and refers to the appended drawings on which.

Detailed Description

Figure 1:
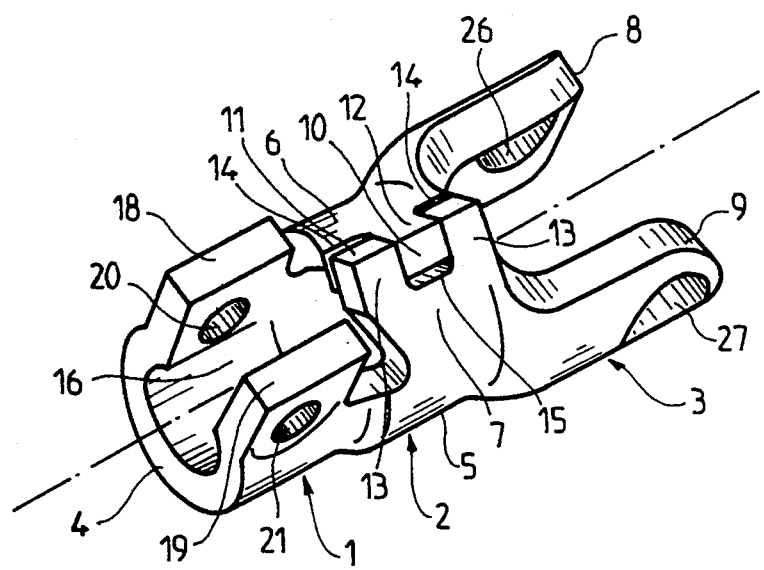
FIG. 1 is a perspective view of a cardan joint claw-type coupling according to an embodiment of the present invention.

FIG. 1 is a perspective view of an embodiment, according to the invention, of a monobloc coupling obtained from a sheet, especially in the form of a blank, a tube section or flat irons, cut and shaped as desired. This coupling is connected on the one hand to a transmitting device such as a shaft (not shown) and on the other to a receiving device.

The monobloc coupling unit consists of three sections distributed in the axial direction:

a linking section 1 for linking the coupling with the torque transmitting device, an intermediate section 2, axially split, and a linking section 3 for linking the coupling with the receiving device.

The linking section 1 includes a split hub 4. The slot in this hub 4 is arranged according to an axial direction of the hub, so that it may be connected to the torque transmitting device, i.e., to the torque transmitting shaft by a fastening system, which loch this split hub 4 on the shaft.

The intermediate section 2 is axially aligned with the split hub 4 and it is also split in the axial direction in order to exhibit two claws 6 and 7. The claw 6 has a longitudinal rim 10 and the claw 7 has also a longitudinal rim 11, which both present complementary profiles, in order to fit one into the other and to absorb the stresses liable to distort the coupling. According to one of the essential characteristics of the invention, penetration of the rim 10 into the rim 11 is carried out so that a first one of the rims penetrates on a second one of the rims of the other side and the second rim of the other side penetrates on the first rim in reciprocal fashion. In this structure, both claws 6 and 7 describe an angle with respect to one another, which is determined so that penetration can be achieved in order to guarantee correct fitting.

The linking section 3 is connected in the axial alignment of the intermediate section and it mainly comprises linking legs 8, 9, as illustrated on FIG. 1. In another embodiment of the invention, the linking section 3 includes two fastening hooks 24, 25 as illustrated on FIG. 6.

Figure 2:
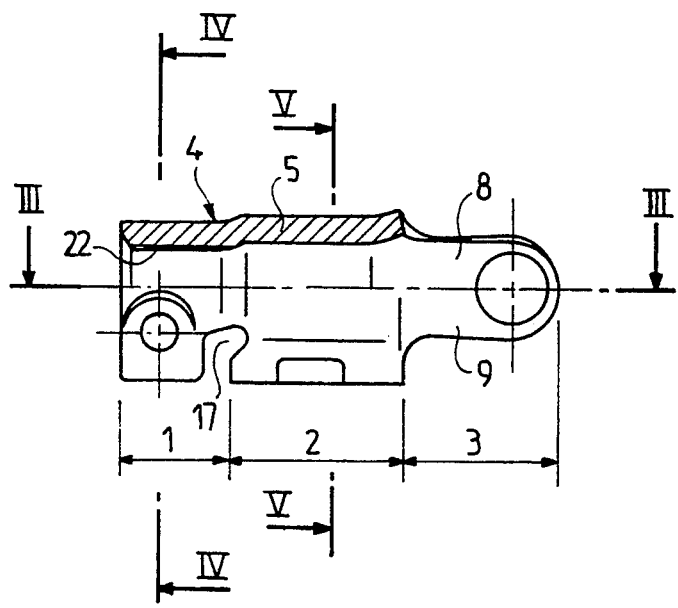
FIG. 2 is a partially cross-sectional view of the coupling shown in FIG. 1.
Figure 4:
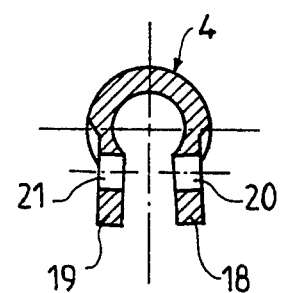
FIG. 4 is a cross-sectional view taken at section IV—IV of FIG. 2.
Figure 3:
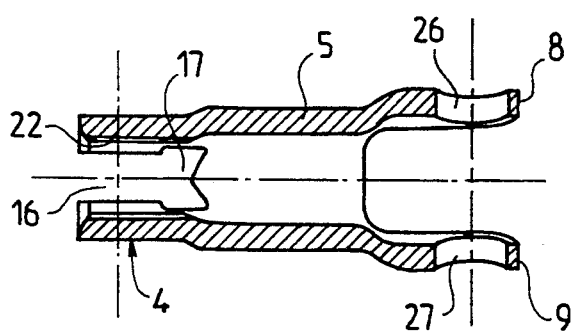
FIG. 3 is a cross-sectional view taken at section III—III of FIG. 2.

As seen in FIGS. 2-4 the linking section 1 includes the split hub 4 which has a portion of complementary shape to that of the torque transmitting shaft and is terminated at its ends by wings 18 and 19 located on both sides of a longitudinal slot 16 substantially parallel to the longitudinal axis of the coupling, i.e., to its rotation axis. Each wing 18 and 19 includes a hole 20 and 21, respectively, which have the same axis with respect to one another in order to form an assembly axis of a fastening unit for fastening of this split hub 4 on the torque transmitting shaft. The fastening unit comprises a tightening bolt (not shown). In order to improve the assembly of the split hub 4 with the torque transmitting shaft, the split hub 4 as well as the shaft are provided with grooves 22 seen in FIG. 3, which facilitate positioning the split hub 4 on the torque transmitting shaft and rotating the split hub together with the torque transmitting shaft.

Figure 5:
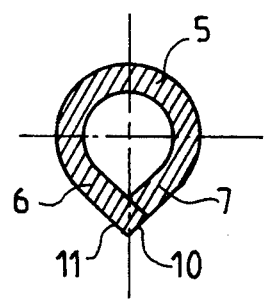
FIG. 5 is a cross-sectional view taken at section V—V of FIG. 2.

The intermediate section 2 is axially aligned with the split hub 4 and is integrated therewith to make up a monobloc piece. As seen in FIG. 5, the intermediate section 2 includes a body 5 having a section portion that is substantially circular in shape, a portion of the section extending, tangentially to the circular portion, to a more or less plane section. The plane portions form the claws 6 and 7. In the embodiment shown in FIG. 5, the claws 6, 7 are substantially perpendicular with respect to one another.

The intermediate section 2 facilitates, one the one hand, complying with the various architectural conditions to which the coupling must be applied, such as the length characteristics of the coupling in the axial direction, and further has an additional role in absorbing the stresses liable to distort the coupling in the complementary profiles formed on the longitudinal rims 10 and 11 of the claws 6 and 7. As seen with reference to FIGS. 1, 5, and 6, the longitudinal rim 10 of the claw 6 exhibits at least one protrusion or lug 12 which penetrates into a recess or mortise 15 arranged in the longitudinal rim 11 of the claw 7. In the same way, the claw 7 comprises at least one protrusion or lug 13, which penetrates into a recess or mortise 14 arranged in the longitudinal rim 10 of the claw 6. These protrusions and these recesses have profiles and sizes which are designed to be complementary in shape with respect to one another to absorb the various stresses liable to distort the coupling unit.

As seen in FIG. 1, for both claws 6 and 7 to be shaped correctly, and to separate the intermediate section 2 from the split hub 4, an opening 17 is formed between the linking section 1 and the intermediate section 2, located between the wing 18 of the split hub 4 and the claw 6 of the intermediate section 2, as well as another opening 17, located between the wing 19 of the split hub 4 and the claw 7 of the intermediate section. Both openings 17 are aligned with the slot 16 of the hub 4. The claws 6 and 7, as described above, absorb the various stresses liable to distort the coupling, while the split hub 4 remains fastened correctly on the torque transmitting shaft.

The linking section 3, as seen in FIG. 1, includes two legs 8 and 9, which are arranged symmetrically with respect to the longitudinal axis of the coupling, i.e., with respect to the rotation axis. These two legs 8 and 9 are connected to and integrated to the intermediate section 2, and they form a cardan joint jaw. The legs 8, 9 each include a hole 26 and 27, respectively.

Figure 6:
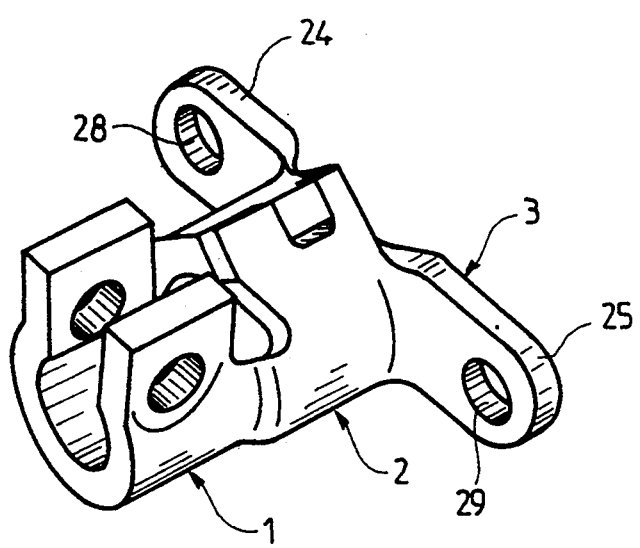
FIG. 6 represents in perspective another embodiment of the coupling according to the invention.

According to another embodiment, shown in FIG. 6, the linking section 3 includes two fastening hooks 24 and 25 which are arranged in a plane substantially perpendicular to the longitudinal axis, i.e., the rotation axis of the coupling unit. Both these legs 24 and 25 are connected to and integrated to the intermediate section 2 and are formed with a hole designated 28 and 29, respectively.

The coupling type according to the invention represented on FIGS. 1 to 5 relates more specifically to an automotive vehicle steering cardan joint jaw.

While this invention has been illustrated and described in accordance with a preferred embodiment, it is recognized that variations and changes may be made therein without departing from the invention as set forth in the claims.

I claim:

1. A coupling for coupling a torque transmitting device to a receiving device, comprising:

a first linking section including a split hub and means for axially securing the torque transmitting device;

an intermediate section including first and second claws, the first and second claws including, at end portions thereof, first and second longitudinal rims, respectively, the end portions of the claws lying in different, intersecting planes such that the end portions of the claws form an angle relative to one another and the first and second longitudinal rims fit into each other; and a second linking section for linking the coupling to a receiving device, the second linking section including at least one leg, wherein the first linking, intermediate, and second linking sections are connected to one another and axially aligned.

2. The coupling as set forth in claim 1, wherein the first linking, intermediate, and second linking sections are formed from a single sheet of material.

3. The coupling as set forth in claim 2, wherein a portion of the intermediate section is substantially circular in cross section.

4. The coupling as set forth in claim 1, wherein a first and a second opening define boundaries between the first and second claws, respectively, and the split hub.

5. The coupling as set forth in claim 1, wherein the first longitudinal rim is formed with one or more protrusions and the second longitudinal rim is formed with one or more corresponding, complementary recesses in which the one or more protrusions are received.

6. The coupling as set forth in claim 1, wherein the split hub is formed with an axial slot.

7. The coupling as set forth in claim 6, wherein the securing means includes a first and a second wing disposed on opposite sides of the slot and means for fastening the first and second wing together so that the torque transmitting device is axially secured.

8. The coupling as set forth in claim 6, wherein the first and second wings are formed with axially aligned holes and the fastening means includes a bolt extending through the holes in the first and second wings.

9. The coupling as set forth in claim 1, wherein the split hub includes at least one of an internal groove or an internal protrusion for engaging with a corresponding external protrusion or external groove, respectively, on the torque transmitting device.

10. The coupling as set forth in claim 1, wherein the second linking section includes two legs disposed symmetrically about a longitudinal axis of the coupling.

11. The coupling as set forth in claim 10, wherein the two legs extend substantially perpendicularly to the longitudinal axis of the coupling.

12. The coupling as set forth in claim 1, wherein the second linking section includes at least one leg extending substantially perpendicularly to a longitudinal axis of the coupling.

13. A coupling for coupling a torque transmitting device to a receiving device, comprising:

a first linking section including a split hub and means for axially securing the torque transmitting device;

an intermediate section including first and second claws, the first and second claws including, at end portions thereof, first and second longitudinal rims, respectively, the end portions of the claws lying in different, intersecting planes such that the end portions of the claws form an angle relative to one another and the first and second longitudinal rims fit into each other; and a second linking section for linking the coupling to a receiving device, the second linking section including at least one leg, wherein the first linking, intermediate, and second linking sections are connected to one another and axially aligned, the first linking, intermediate, and second linking sections are formed from a single sheet of material, a portion of the intermediate section is substantially circular, and the angle formed by the end portions of the claws is substantially a right angle.

14. A coupling for coupling a torque transmitting device to a receiving device, comprising:

a first linking section including a split hub and means for axially securing the torque transmitting device;

an intermediate section including first and second claws, the first and second claws including, at end portions thereof, first and second longitudinal rims, respectively, the end portions of the claws lying in different, intersecting planes such that the end portions of the claws form an angle relative to one another and the first and second longitudinal rims fit into each other; and a second linking section for linking the coupling to a receiving device, the second linking section including at least one leg, wherein the first linking, intermediate, and second linking sections are connected to one another and axially aligned, and the angle formed by the end portions of the claws is substantially a right angle.

* * * * *